(12) United States Patent
Stille

(10) Patent No.: US 7,931,428 B2
(45) Date of Patent: Apr. 26, 2011

(54) AIRCRAFT PAYLOAD RETENTION SYSTEM FOR INTERIOR LOADS

(75) Inventor: Brandon L. Stille, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 428 days.

(21) Appl. No.: 12/160,915

(22) PCT Filed: Jan. 19, 2007

(86) PCT No.: PCT/US2007/060743
§ 371 (c)(1),
(2), (4) Date: Jul. 15, 2008

(87) PCT Pub. No.: WO2008/054831
PCT Pub. Date: May 8, 2008

(65) Prior Publication Data
US 2008/0317562 A1    Dec. 25, 2008

Related U.S. Application Data

(60) Provisional application No. 60/776,280, filed on Feb. 23, 2006.

(51) Int. Cl.
*B60P 7/08* (2006.01)
(52) U.S. Cl. .................. 410/7; 410/4; 410/23
(58) Field of Classification Search .......... 410/3, 4, 410/7, 23, 44, 87, 96; 188/377; 244/118.1, 244/137.1, 137.3; 248/499
See application file for complete search history.

(56) References Cited

U.S. PATENT DOCUMENTS

| | | |
|---|---|---|
| 3,352,516 A | 11/1967 | Jackson |
| 3,428,275 A | 2/1969 | Condodoma et al. |
| 3,713,609 A | 1/1973 | Matthew |
| 3,972,500 A | 8/1976 | Johnson et al. |
| 4,005,765 A | 2/1977 | Reilly |
| 4,077,590 A | 3/1978 | Shorey |
| 4,336,868 A | 6/1982 | Wilson |
| 4,399,980 A | 8/1983 | van Schie |
| 4,630,982 A | 12/1986 | Fenner |
| 5,085,382 A | 2/1992 | Finkenbeiner |
| 5,217,184 A | 6/1993 | Hararat-Tehrani |
| 5,248,129 A | 9/1993 | Gertz |
| 5,520,357 A | 5/1996 | Payne et al. |
| 5,547,148 A | 8/1996 | Del Monte et al. |
| 5,676,508 A | 10/1997 | Weicht |
| D408,267 S | 4/1999 | Egigian et al. |

(Continued)

OTHER PUBLICATIONS

PCT International Search Report and written opinion mailed Aug. 25, 2008.

*Primary Examiner* — Stephen Gordon
(74) *Attorney, Agent, or Firm* — Carlson Gaskey & Olds PC

(57) ABSTRACT

An aircraft payload retention system includes a cable, a brake assembly, a hollow crushable member and a hollow structural member. The hollow structural member is fixed adjacent an aircraft internal cargo bay. In response to a high-G condition, the payload may break free from a tie-down system and move forward. The brake assembly engages the hollow crushable member within the hollow structural member and begins to crush the hollow crushable member as the cable is pulled therethrough to dissipate energy of the payload into the structure of the aircraft to arrest forward movement of the payload toward the cockpit.

13 Claims, 6 Drawing Sheets

U.S. PATENT DOCUMENTS

| | | | |
|---|---|---|---|
| 5,927,646 A | 7/1999 | Sandy et al. | |
| 6,010,286 A | 1/2000 | Cross et al. | |
| 6,030,159 A | 2/2000 | Herrick et al. | |
| 6,048,145 A * | 4/2000 | Pedersen | 410/100 |
| 6,138,975 A | 10/2000 | McDaid | |
| 6,202,261 B1 | 3/2001 | Moore et al. | |
| 6,244,571 B1 | 6/2001 | Reid et al. | |
| 6,260,813 B1 | 7/2001 | Whitcomb | |
| D446,442 S | 8/2001 | Simpson | |
| 6,394,241 B1 | 5/2002 | Desjardins et al. | |
| 6,536,985 B2 | 3/2003 | Albritton | |
| 6,536,986 B1 | 3/2003 | Anghileri et al. | |
| 6,712,568 B2 | 3/2004 | Snyder et al. | |
| 6,962,245 B2 | 11/2005 | Ray et al. | |
| 7,101,111 B2 | 9/2006 | Albritton | |
| 7,140,823 B2 | 11/2006 | Ackerman et al. | |
| 7,337,882 B2 | 3/2008 | Geyer | |
| 2004/0140090 A1 | 7/2004 | Mason et al. | |
| 2006/0243854 A1 | 11/2006 | Townsend et al. | |

* cited by examiner

Normal Operations

AIRCRAFT PAYLOAD RETENTION SYSTEM FOR INTERIOR LOADS

The present invention claims the benefit of U.S. Provisional Patent Application No. 60/776,280, filed Feb. 23, 2006.

BACKGROUND OF THE INVENTION

The present invention relates to a payload retention system, and more particularly to a payload retention system which arrests the payload during high-G conditions to control the payload and protect the aircrew.

Future military forces require enhanced vertical lift capabilities in a compact package. Super heavy lift (SHL) rotary-wing aircraft are generally defined as an aircraft with twice the largest payload of current helicopters. Future requirements are envisioned to be in the range of over 80,000 pounds of payload over a 400 mile range while being shipboard compatible such that vehicles may be readily transported within an aircraft cargo bay.

Restraining such vehicle payloads may be relatively difficult during high-G conditions. Current aircraft generally incorporate aircraft payload retention systems such as tie-down systems which receive chains to securely fix the payload within the aircraft cargo bay. Although effective to secure the payload during normal flight conditions, such tie-down systems do not provide energy absorption capability under high-G conditions. Under such conditions, payloads such as vehicles may break free and move forward toward the cockpit.

Accordingly, it is desirable to provide an aircraft payload retention system which arrests movement of the payload and protects the aircrew under high-G conditions.

SUMMARY OF THE INVENTION

The present invention provides an aircraft payload retention system mounted within an aircraft internal cargo bay. The payload retention system generally includes a cable, a brake assembly, a hollow crushable member and a hollow structural member.

The cable defines a first end segment with a connector link and a second end segment connected to the brake assembly. The hollow structural member is fixed adjacent the internal cargo bay such as under the cargo bay floor to form a structural portion of the aircraft airframe. The brake assembly includes a stop and a jackscrew actuator. The jackscrew actuator enables the payload retention system to take-up any slack in the cable and accommodate various payloads.

In response to a high-G condition, the payload may break away from the tie-down system and begin to move forward. As the payload moves forward, the stop engages the hollow crushable member and begins to crush or otherwise plastically deform the hollow crushable member within the hollow structural member as the stop is pulled through the hollow structural member thereby dissipating the energy of the payload into the structure of the aircraft during the high-G condition. As the payload continues to move forward, the cable continues to pull the stop through the hollow structural member and crush the hollow crushable member to absorb significant energy and thereby arrest movement of the payload toward the aircraft cockpit.

The present invention therefore provides an aircraft payload retention system which arrests movement of the payload and protects the aircrew under high-G conditions

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
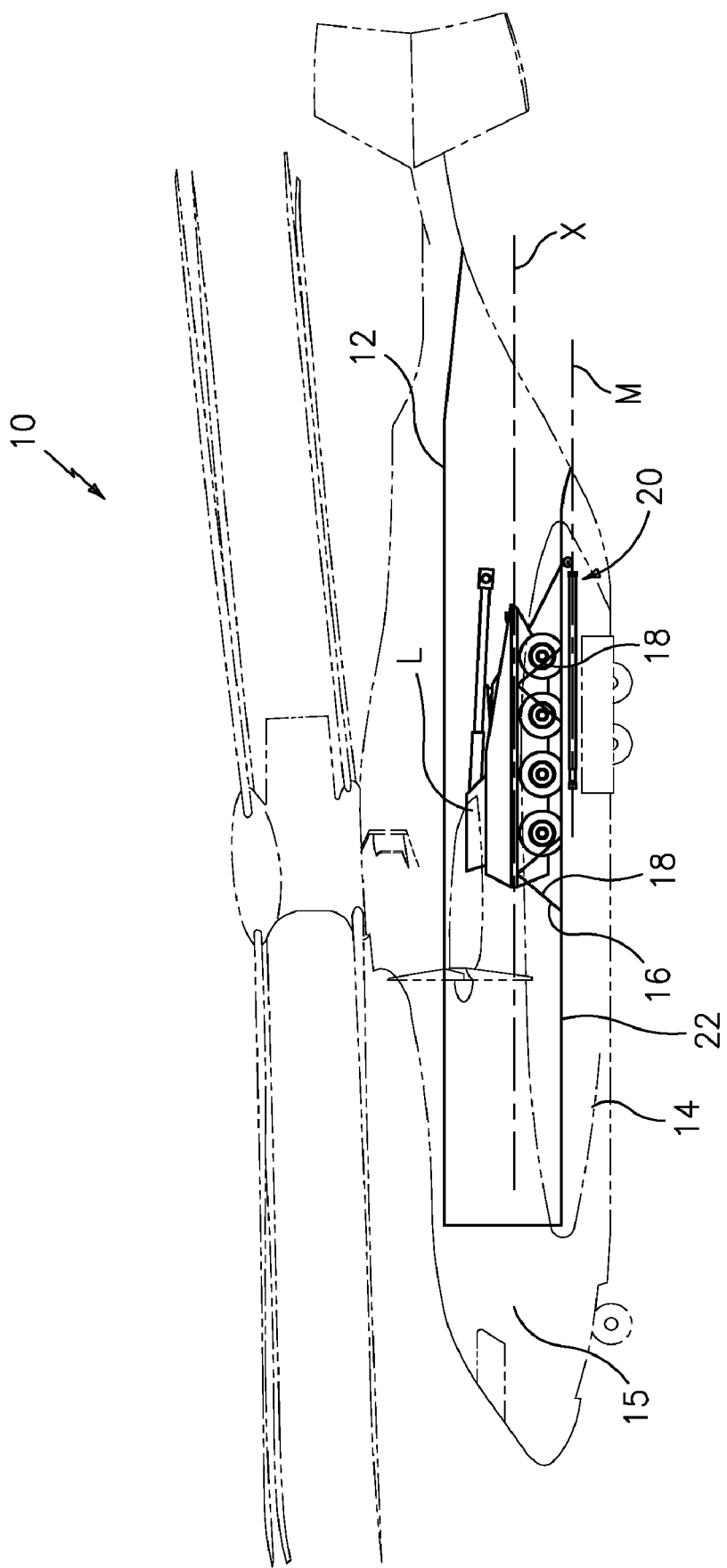
FIG. 1 is a general perspective view of an exemplary aircraft with an internal cargo bay.

FIG. 1 schematically illustrates an aircraft 10 having an internal cargo bay 12 defined by an airframe 14 having a forward area 15 which typically includes a cockpit. The aircraft 10 often operates to transport cargo payloads L such as vehicles which may be driven in and out of the internal cargo bay 12 as well as other cargo loads. Although a particular type of vertical takeoff and landing (VTOL) rotary-wing aircraft configuration is illustrated in the disclosed embodiment, other aircraft which carry cargo internally such as conventional fixed wing cargo aircraft, helicopters, flying cranes, tilt-rotor and tilt-wing aircraft will also benefit from the present invention.

The internal cargo bay 12 includes a tie-down system 16 to restrain the payload L. The tie-down system 16 is typically located within an aircraft internal cargo bay floor 22 to interconnect a multiple of restraints 18 such as chains with the payload L.

Figure 2A:
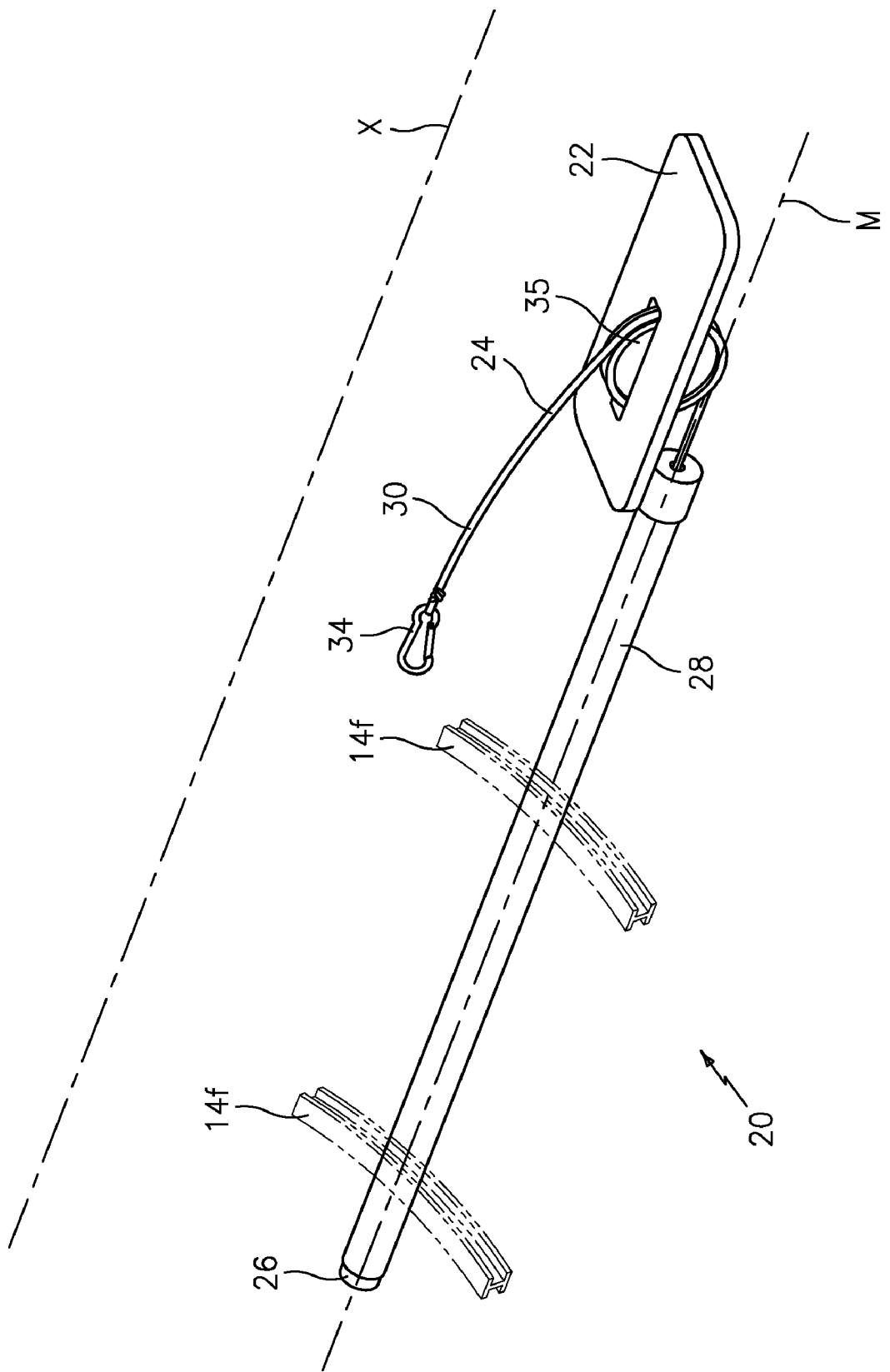
FIG. 2A is a schematic perspective view of an aircraft internal cargo bay with a payload retention system according to the present invention.
Figure 2B:
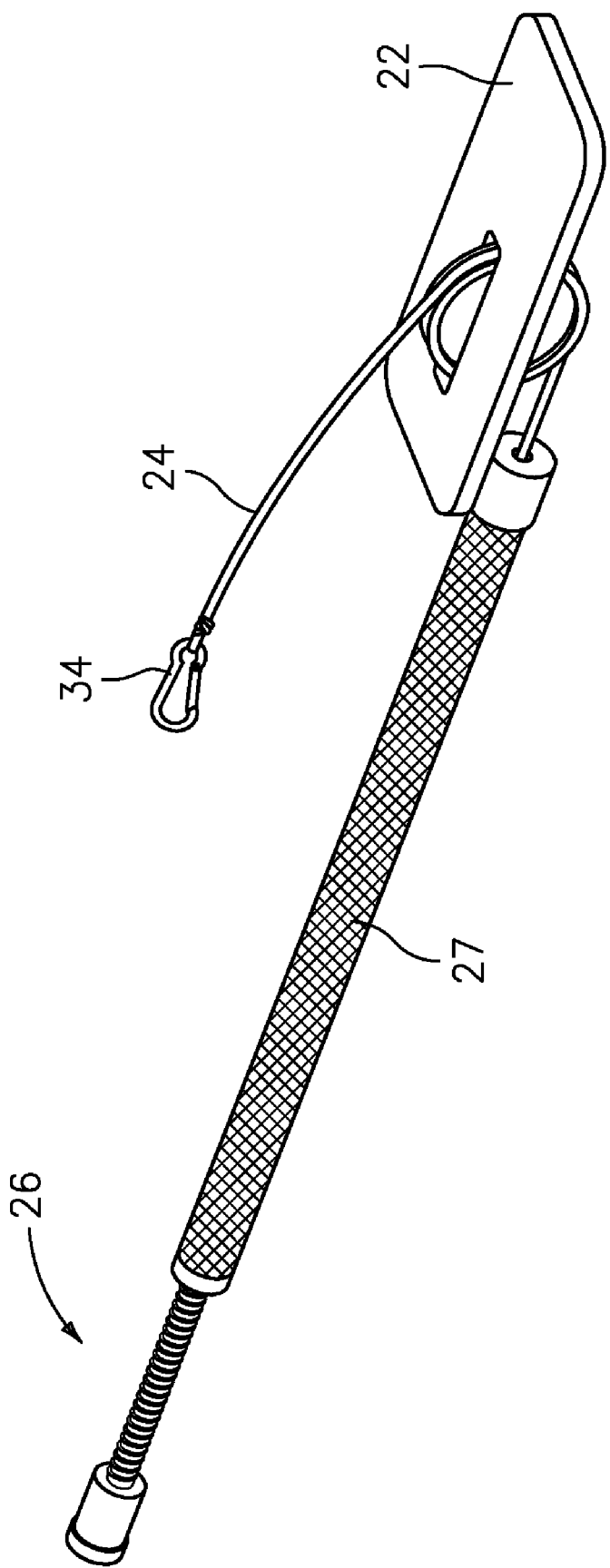
FIG. 2B is a perspective view of the payload retention system with the hollow structural member removed.

Referring to FIG. 2A, an energy-absorbing payload retention system 20 is mounted adjacent the aircraft internal cargo bay floor 22. The payload retention system 20 generally includes a cable 24, a brake assembly 26, a hollow crushable member 27 (FIG. 2B) and a hollow structural member 28. It should be understood that the payload retention system 20 may be located in a multiple of locations and oriented in various directions other than as illustrated in the disclosed embodiment.

Figure 2C:
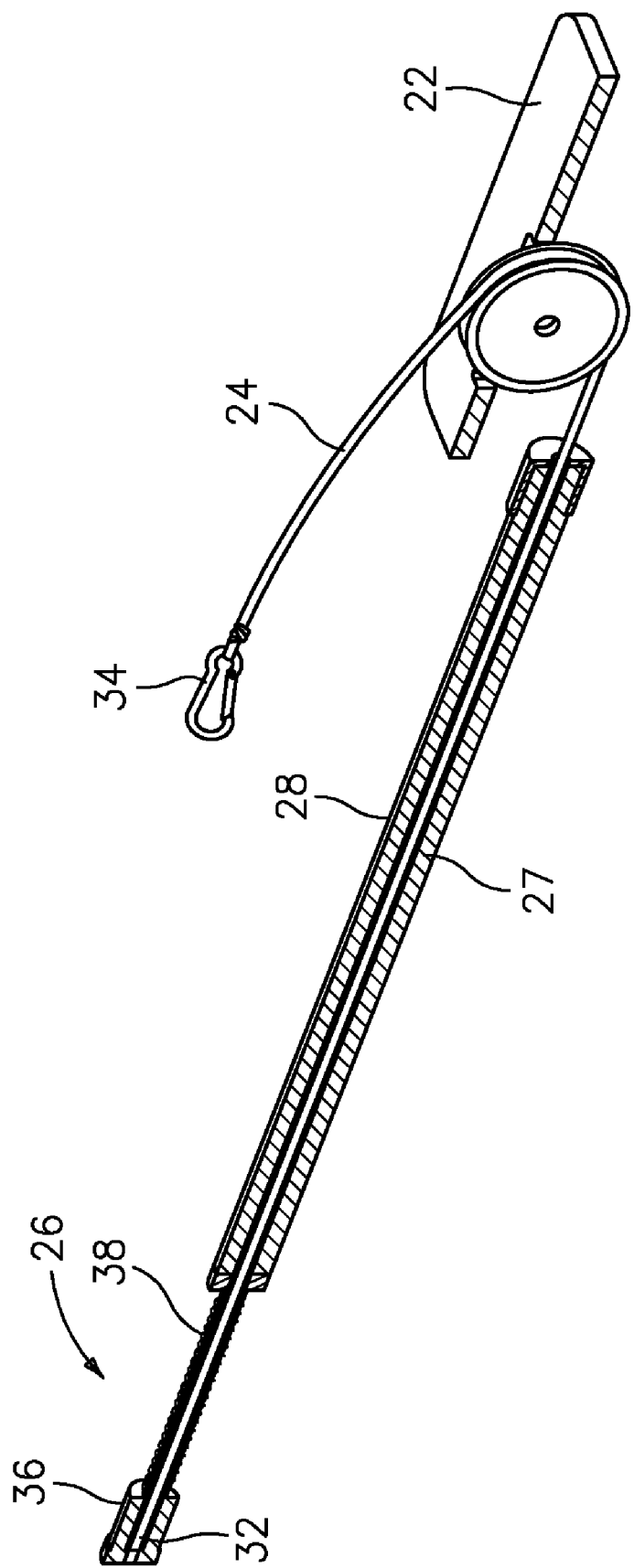
FIG. 2C is a perspective longitudinal sectional view of the payload retention system.

The cable 24 is preferably a high tensile strength member having a first end segment 30 and a second end segment 32 (FIG. 2C). The first end segment 30 preferably includes a connector link 34 such as a chain or pendant which is readily attachable and de-attachable to the payload L. The second end segment 32 is connected to the brake assembly 26.

The hollow structural member 28 is fixed adjacent the internal cargo bay 12 such as under the cargo bay floor 22 along a longitudinal axis M generally parallel an aircraft longitudinal axis X (FIG. 1). The hollow structural member 28 may alternatively or additionally form a structural portion of the airframe 14 such as by being mounted to frame members 14F of the airframe or the like. That is, the hollow structural member 28 is preferably integrated into the airframe 14 to operate as a structural component during normal operation of the aircraft. It should be understood that the hollow structural member 28 may alternatively be incorporated in other aircraft locations such as a cabin wall and in other orientations such as transverse to the aircraft longitudinal axis X with the cable controlled through a pulley system 35 or such like. It should also be further understood that a multiple of the energy-absorbing payload retention system 20 may additionally be provided adjacent the internal cargo bay 12 such as in each sidewall. The hollow structural member 28 is preferably a structural tube, although other cross-sectional shapes are envisioned.

Referring to FIG. 2C, the hollow crushable member 27 is located along axis M and is preferably formed of a crushable or plastically deformable material such as a honeycomb core. The hollow crushable member 27 preferably closely fits within the hollow structural member 28 and includes a passage 27H through which the cable 24 passes.

The brake assembly 26 includes a stop 36 and a jackscrew actuator 38. The jackscrew actuator 38 enables the payload retention system 20 to take-up any slack in the cable 24. That is, the jackscrew actuator 38 is rotated relative the stop 36 to adjust slack in the cable 24 relative the payload to thereby accommodate payloads of various types. Although providing some tie-down of the payload L, the tie-down system 16 operates to provide general retention of the payload L during normal operational conditions.

Although providing adjustment under normal operation to tension the cable 24 and take-up slack, the jackscrew actuator 38 readily locks to the stop 36 in response to a tension applied to the cable 24 such as during a high-G condition as is typical of a jackscrew under such tension. The high-G condition thereby rotationally locks the stop 36 to cable 24 such that the stop 36 moves with the cable 24 relative the hollow structural member 28 to therein engage the hollow crushable member 28 which absorbs energy from the payload L.

The stop 36 is configured to crush or otherwise plastically deform the hollow crushable member 27 as the stop 36 is pulled through the hollow structural member 28 to dissipate the energy of the moving payload L into the airframe 14 during the high-G condition. As the hollow crushable member 27 is contained within the hollow structural member 28, energy absorption may be increased over the length of the movement of the stop 36 in a non-linear manner. That is, the hollow crushable member 27 essentially provides increased resistance over the length thereof. It should be understood, however, that any energy dissipation profile may be defined by the crushable hollow member 27.

Figure 3A:
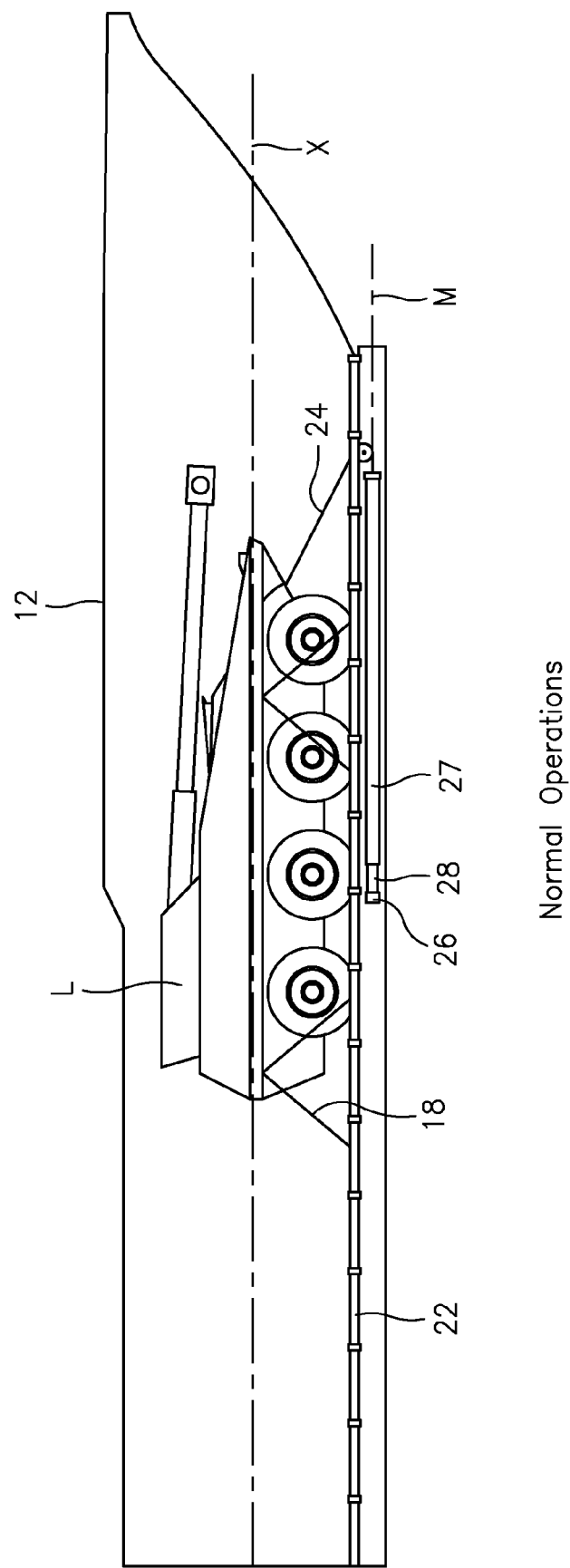
FIG. 3A is a schematic sectional view of an aircraft with a payload retention system in a normal operational position.
Figure 3B:
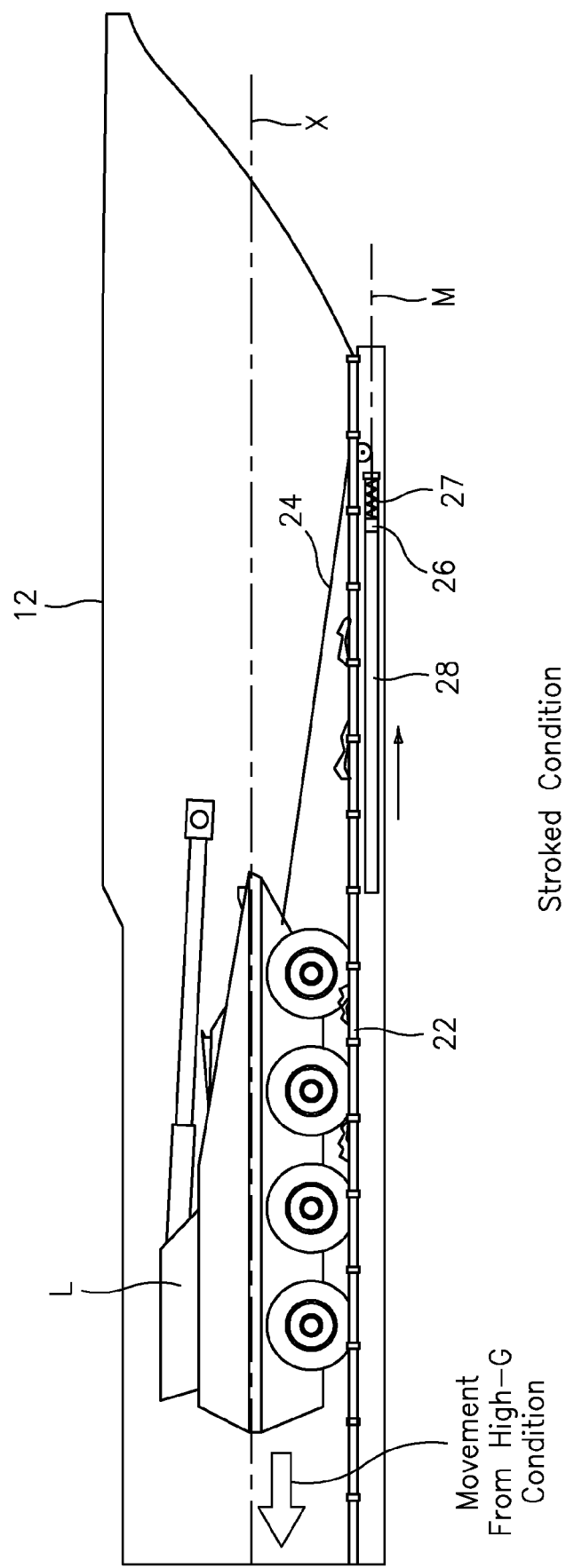
FIG. 3B is a schematic sectional view of an aircraft with a payload retention system in an actuated position.

In use, and with reference to FIGS. 3A-3B, the energy-absorbing payload retention system 20 is sized and configured to prevent the payload from moving fully forward into the aircraft cockpit. In response to a high-G condition, the payload may break away from the tie-down system 16 and begin to moves forward. As the payload L moves forward under the high-G condition, the jackscrew actuator 38 locks to the stop 36 and the brake assembly 26 moves as unit into full engagement with the hollow crushable member 27. The brake assembly 26 begins to crush or otherwise plastically deform the hollow crushable member 27 within the hollow structural member and thus absorb energy. As the payload L continues to move forward in response to the high-G condition, the cable 24 continues to pull the brake assembly 26 through the hollow structural member 28 which continues to crush the hollow crushable member 27 and absorb significant energy to thereby arrest movement of the payload L toward the forward area 15 of the aircraft.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An energy-absorbing payload retention system to arrest movement of a payload within an internal cargo bay, comprising:
   a hollow structural member;
   hollow crushable member within said hollow structural member;
   a brake assembly; and
   a cable through said hollow crushable member, said cable having a first end segment mounted to said brake assembly and a second end segment having a link for removable attachment to the payload within the internal cargo bay.

2. The system as recited in claim 1, wherein said hollow structural member is a tubular member.

3. The system as recited in claim 1, wherein said hollow structural member is a structural airframe member.

4. The system as recited in claim 1, wherein said brake assembly includes a stop.

5. The system as recited in claim 4, wherein said stop is sized to move within said hollow structural member to plastically deform said hollow crushable member in response to a high-G condition.

6. The system as recited in claim 1, wherein said brake assembly includes a stop and a jackscrew actuator.

7. The system as recited in claim 6, wherein said jackscrew actuator adjusts a length of said cable relative said link.

8. The system as recited in claim 1, wherein said hollow crushable member is a honeycomb core with a passage through which said cable passes.

9. An aircraft, comprising:
   an internal cargo bay;
   a hollow structural member mounted to an airframe structural member;
   hollow crushable member within said hollow structural member;
   a brake assembly; and
   a cable through said hollow crushable member, said cable having a first end segment mounted to said brake assembly and a second end segment having a link for removable attachment to a payload within said internal cargo bay, said brake assembly movable within said hollow structural member to plastically deform said hollow crushable member in response to a high-G condition to arrest movement of the payload toward a forward area of the aircraft.

10. The system as recited in claim 9, wherein said hollow structural member is an airframe structural member.

11. The system as recited in claim 9, wherein said hollow structural member is mounted adjacent an aircraft cargo bay floor.

12. The system as recited in claim 11, further comprising a pulley system which guides said cable relative to said aircraft cargo bay floor.

13. The system as recited in claim 11, further comprising a tie-down system mounted within said aircraft cargo bay floor to tie-down the payload within the internal cargo bay.

* * * * *